US007522920B2

(12) United States Patent
Hannu et al.

(10) Patent No.: US 7,522,920 B2
(45) Date of Patent: Apr. 21, 2009

(54) METHOD AND APPARATUS FOR PARAMETER RECODING

(75) Inventors: Pirila Hannu, Littoinen (FI); Harri Jokinen, Pertteli (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/925,639

(22) Filed: Aug. 24, 2004

(65) Prior Publication Data

US 2005/0048970 A1 Mar. 3, 2005

Related U.S. Application Data

(60) Provisional application No. 60/497,965, filed on Aug. 25, 2003.

(51) Int. Cl.
*H04Q 7/00* (2006.01)
(52) U.S. Cl. .................... 455/432.2; 455/453; 455/436; 455/525; 370/335; 370/342
(58) Field of Classification Search ................ 455/436, 455/442, 522, 441, 432, 453, 432.2, 525; 370/320, 392, 335, 94.1, 95.1, 342; 709/224; 716/1; 375/130
See application file for complete search history.

(56) References Cited

U.S. PATENT DOCUMENTS

| 5,757,813 | A | * | 5/1998 | Raith ........................ 714/708 |
| 6,285,884 | B1 | * | 9/2001 | Vaara ........................ 455/441 |
| 6,393,286 | B1 | | 5/2002 | Svensson |
| 6,418,321 | B1 | | 7/2002 | Itoh |
| 6,466,556 | B1 | | 10/2002 | Boudreaux |
| 6,584,325 | B1 | | 6/2003 | Shakhgildian |
| 6,804,216 | B1 | * | 10/2004 | Kuwahara et al. ........... 370/335 |
| 6,871,328 | B1 | * | 3/2005 | Fung et al. .................... 716/1 |
| 2002/0173314 | A1 | * | 11/2002 | Hwang et al. ............... 455/453 |
| 2003/0128674 | A1 | * | 7/2003 | Kong et al. .................. 370/320 |
| 2003/0161311 | A1 | * | 8/2003 | Hiironniemi ................ 370/392 |
| 2004/0034704 | A1 | * | 2/2004 | Connelly .................... 709/224 |
| 2004/0053632 | A1 | * | 3/2004 | Nikkelen et al. ............ 455/522 |

FOREIGN PATENT DOCUMENTS

WO WO 00/27158 5/2000

OTHER PUBLICATIONS

3GPP TS 05.08 V8.17-0 (Jun. 2003) 3rd Generation Partnership Project; Technical Specification Group GSM/EDGE Radio Access Network; Radio subsystem link control (Release 1999)—25 Pages.
European Telecommunication Standard Draft pr ETS 300 911 Digital cellular telecommunications. System (Phase 2+); Radio subsystem link control (GSM 05.08 version 5.8.0 Release (1996) Jul. 1998 Sixth Edition—43 pages.
GSM 04.18 V8.0.0 (Jul. 1999) Technical Specification—Digital cellular telecommunications system (Phase 2+) Mobile radio interface layer 3 specification, Radio Resource Control Protocol (GSM 04.18 version 8.0.0 Release 1999)—257 pages.
European Search Report dated Aug. 21, 2008 for EP Application 04769169.
Vodafone: "Insufficient range of the $FDD_{13}$ Qmin parameter; 3GPP TSG GERAN (WG1) meeting #16; GP-032068" 3GPP TSG GERAN WG1, Aug. 15, 2003, pp. 1-3, XP002491134 New York, USA *the whole document*.

* cited by examiner

*Primary Examiner*—Charles N Appiah
*Assistant Examiner*—Michael T Vu

(57) ABSTRACT

The present invention relates to a method and apparatus for specifying new values for old parameters for controlling the operation of a mobile device with a network node or element in a network; and, more particularly, relates to a method and apparatus for mapping threshold values to a certain measurable parameter, and coding the threshold values in such a way that one part of the mapping is kept unchanged and another part of the mapping is changed in order to enable different interpretations by a mobile device of the certain measurable parameter, especially for controlling a cell reselection by the mobile device from a Global System for Mobile Communications (GSM) to a Third Generation Partnership Project (3GPP) wireless network.

19 Claims, 3 Drawing Sheets

METHOD AND APPARATUS FOR PARAMETER RECODING

CROSS REFERENCE TO RELATED APPLICATIONS

This application is related to and claims benefit to provisional patent application Ser. No. 60/497,965, filed Aug. 25, 2003, entitled "Parameter Recoding Method," which is hereby incorporated by reference in its entirety.

BACKGROUND OF THE INVENTION

1. The Field of the Invention

The present invention relates to a method and apparatus for specifying new values for old parameters for controlling the operation of a mobile device with a network node or element in a network; and, more particularly, relates to a method and apparatus for mapping threshold values to a certain measurable parameter, and coding the threshold values in such a way that one part of the mapping is kept unchanged and another part of the mapping is changed in order to enable different interpretations by the mobile device of the certain measurable parameter, especially for controlling a cell reselection by the mobile device from a Global System for Mobile Communications (GSM) to a Third Generation Partnership Project (3GPP) wireless network.

2. Description of Related Art

In the 3GPP standardization process, a potential problem has been identified in which there may be an insufficient range for a parameter called the "FDD_Qmin parameter" which pertains to handovers between different Radio Access Technologies (RATs), such as Global System for Mobile Communications (GSM) to 3GPP handovers and multimode operation.

In particular, the algorithm controlling the GSM to the Universal Mobile Telecommunications System (UMTS) cell reselection is based on the following formulae:

$$CPICH\ Ec/No > FDD\_Qmin$$

and $$CPICH\ RSCP > RLA(s+n) + FDD\_Qoff,$$

where
- CPICH Ec/No: Ec/No (received energy per chip) of the CPICH (Common Pilot Channel) of the target 3G Universal Terestrial Radio Access Network (UTRAN) cell,
- FDD_Qmin: Minimum threshold for Ec/No for UTRAN frequency division duplex (FDD) cell re-selection,
- CPICH RSCP: Received Signal Code Power, average of signal after despreading and combining,
- RLA(s+n): Receive Level Average of serving and neighbouring GSM cells, and
- FDD_Qoff: Offset between signal strength of GSM and UTRAN Cells.

The formulae are derived from the description in 3GPP TS 05.08, sub-clause 6.6.5 of 3GPP TS 05.08, entitled "3rd Generation Partnership Project; Technical Specification Group GSM/EDGE Radio Access Network; Radio subsystem link control (Release 1999)", which is hereby incorporated by reference in its entirety.

The FDD_Qmin parameter typically has a range of −20 to −13 dB in 1 dB steps and is coded using 3 bits (see 3GPP TS 05.08 and 3GPP TS 04.18, "3rd Generation Partnership Project; Technical Specification Group GSM/EDGE Radio Access Network; Mobile radio interface layer 3 specification; Radio Resource Control Protocol (Release 1999)"). Some studies suggest that the minimum value of CPICH Ec/No required to maintain a call is approximately −16 to −14.2 dB. If the FDD_Qmin parameter is set to the maximum value of −13 dB, then this only allows a small margin between the FDD_Qmin value and the minimum acceptable CPICH Ec/No threshold. This can result in inter-RAT (Radio Access Technology) cell reselection occurring to the UMTS cell when the cell is not truly suitable and able to offer a reliable, stable service.

FIG. 1 shows drive trial results for the CPICH Ec/No, in which slow fading can be seen and the Ec/No frequently falls below the minimum acceptable level to maintain a call. Thus the FDD_Qmin parameter may need to have a wider range, which would allow a suitable margin between the minimum level and the trigger for inter-RAT cell reselection.

In comparison, the equivalent parameters for controlling UMTS to GSM cell reselection are Qqualmin and SratSearch. The Qualmin parameter has a range of −24 to 0 dB and the SratSearch parameter has a range −32 to +20 dB. The limitation of the FDD_Qmin parameter makes it difficult to achieve stability between 2G and 3G cell reselections. To control inter-RAT reselection ping-pong, a 3G quality threshold must be set for the UTRAN to GSM Edge Radio Access Network (GERAN) cell reselection with a margin of at least 3 dB away from the GERAN to UTRAN cell reselection equivalent.

No effective solutions to this problem are known. In view of this, there is a need in the prior art to solve this problem.

SUMMARY OF THE INVENTION

The present invention provides a new and effective solution to solve the aforementioned problem.

In its broadest sense, the present invention provides a method and apparatus for controlling the operation of mobile devices by sending threshold values to the mobile devices, where the mobile devices have different interpretations for the threshold values, and where the network element has means for mapping the threshold values to a certain measurable parameter. In the present invention, the apparatus is characterized in that a network element has means for coding the threshold values in such a way that the part of the mapping is kept unchanged and part of the mapping is changed in order to enable the different interpretations of the measurable parameter. In an alternative embodiment, all parts of the mapping are changed to enable the different interpretations of the certain measurable parameter.

The present invention provides several different ways to solve the aforementioned problem, including:

1. Shifting the range so that it covers a different dynamic range; e.g. −17 to −10 dB. However, it may be that 7 dB is still an insufficiently large range.

2. Maintaining the resolution of 1 dB and allowing a larger range. This solution would imply a change in the size of the field (e.g. from 3 to 4 bits) and therefore a change to the CNS.1 coding of the two System Information messages where this parameter is broadcast, thus possibly having a bigger impact on overall mobile subscriber (MS) implementations. In view of this, this solution is a possibility but may have some drawbacks.

3. Decreasing the resolution by modifying the step size: e.g. 2 dB steps, resulting in an increased range from −20 to −6 dB.

In the present invention, the network element may form part of the UTRAN, such as being a part of either a radio network controller (RNC), a Node B, or some combination thereof.

The invention has applications in situations where there is need to specify new values for an old parameter. Normally products that are based on old parameter values will not work or performance is not adequate when new parameter values are used. To minimize this problem, according to the present invention, new parameter values shall be specified in such a way that the most probable old values are effectively reused in such a way that no degradation is expected in performance. For example, if the old parameter values are in a range from 1 to 10 and normally only the parameter values 9 or 10 are typically used, then, according to the invention, the new parameter values for 9 and 10 are kept the same and only the values for 1 to 8 are changed. Hence, old or legacy phones or terminals will normally work perfectly well with the new values, because the probability for use of parameter values 1 to 8 is reasonably low. (In the telecommunications industry, the legacy phone or terminal problem relates to the need to continue to enable 2G phones or terminal to operate in the new 3G networks to the extend possible.)

Alternatively, another possibility is to define the most probable old values in such a way that better system performance can be achieved. Coding for old terminals differ for the most probable old parameter values compared to new parameter values. Old terminals work best with old parameters and at the same time for new terminals even better performance can be achieved.

Note that this recoding of parameter values can be done for the same parameters more than once. The transition period could be handled so that that parameters are changed keeping the most probable values.

In one embodiment according to the present invention, a network element is provided for controlling the operation of one or more mobile devices by sending parameter values thereto, the one or more mobile devices having an interpretation for the parameter values. In this embodiment, a first parameter mapping at the network element is initially the same as a first parameter interpretation at the one or more mobile devices; during a transition period, the first parameter mapping is changed to a second parameter mapping at the network element and to a second parameter interpretation at the mobile devices independently from each other; the second parameter mapping has at least one compatible parameter value from both the first and second parameter interpretations at the one or more mobile devices; and the network element, independent of the first or second parameter mappings being used at the network element, substantially refrains from using only the at least one compatible parameter value of the second parameter mapping for the transition period.

According to the present invention, after the transition period when the one or more mobile devices have the second parameter interpretation, the network element using the second parameter mapping may also use an unrestricted range of the second parameter mapping. Moreover, the at least one compatible parameter value may include one or more values that overlap both the first and second parameter mappings. Further, the parameter values may include thresholds in relation to the control of the operation of the one or more mobile devices by the network element.

It is important to note that, while the present invention relates to the network element controlling the operation of one or more mobile devices during the transition period and to make the transitional period easier, the overall system or network typically will not allow the use of two parameter interpretations forever in the terminals or mobile devices and network. When the new parameters are taken into use, every node, network element or party needs an update for the new mapping, although the terminals and relevant network elements do not need to update at the same time simultaneously.

During the transition period the network elements use those parameter values which lead to the reasonable operation of the system not depending on whether the mobile devices or terminals support the new parameter or not. In the operation of the system, there are no changes during the transition period when the individual terminal or network element is updated. After the transitional period the new parameter set is to be used which is not compatible to the old one.

BRIEF DESCRIPTION OF THE DRAWING

The drawing includes the following Figures, which are not drawn to scale.

BEST MODE FOR CARRYING OUT THE INVENTION

Figure 1:
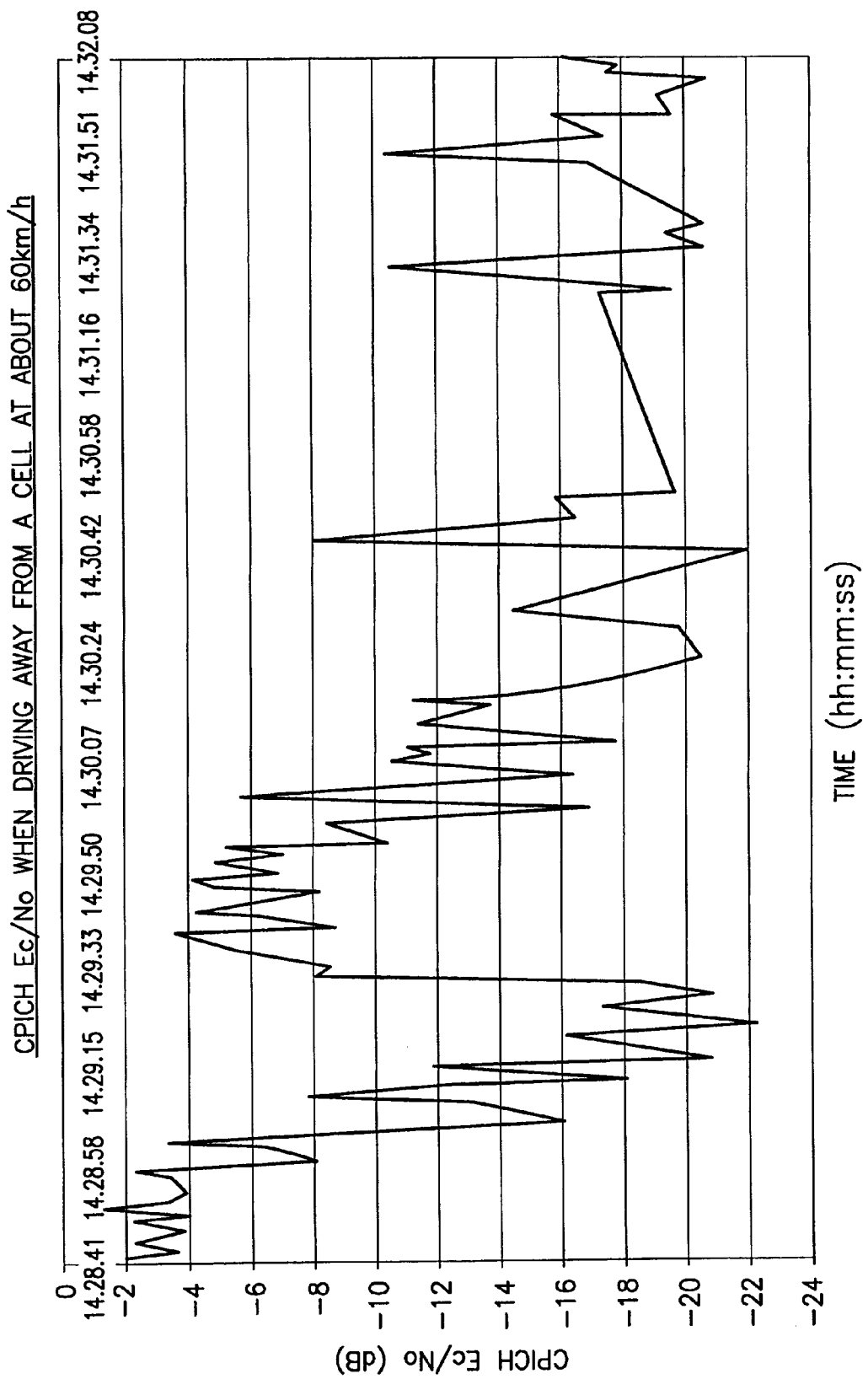
FIG. 1 illustrates a graph of drive trial results for the CPICH Ec/No in relation to time.
Figure 2:
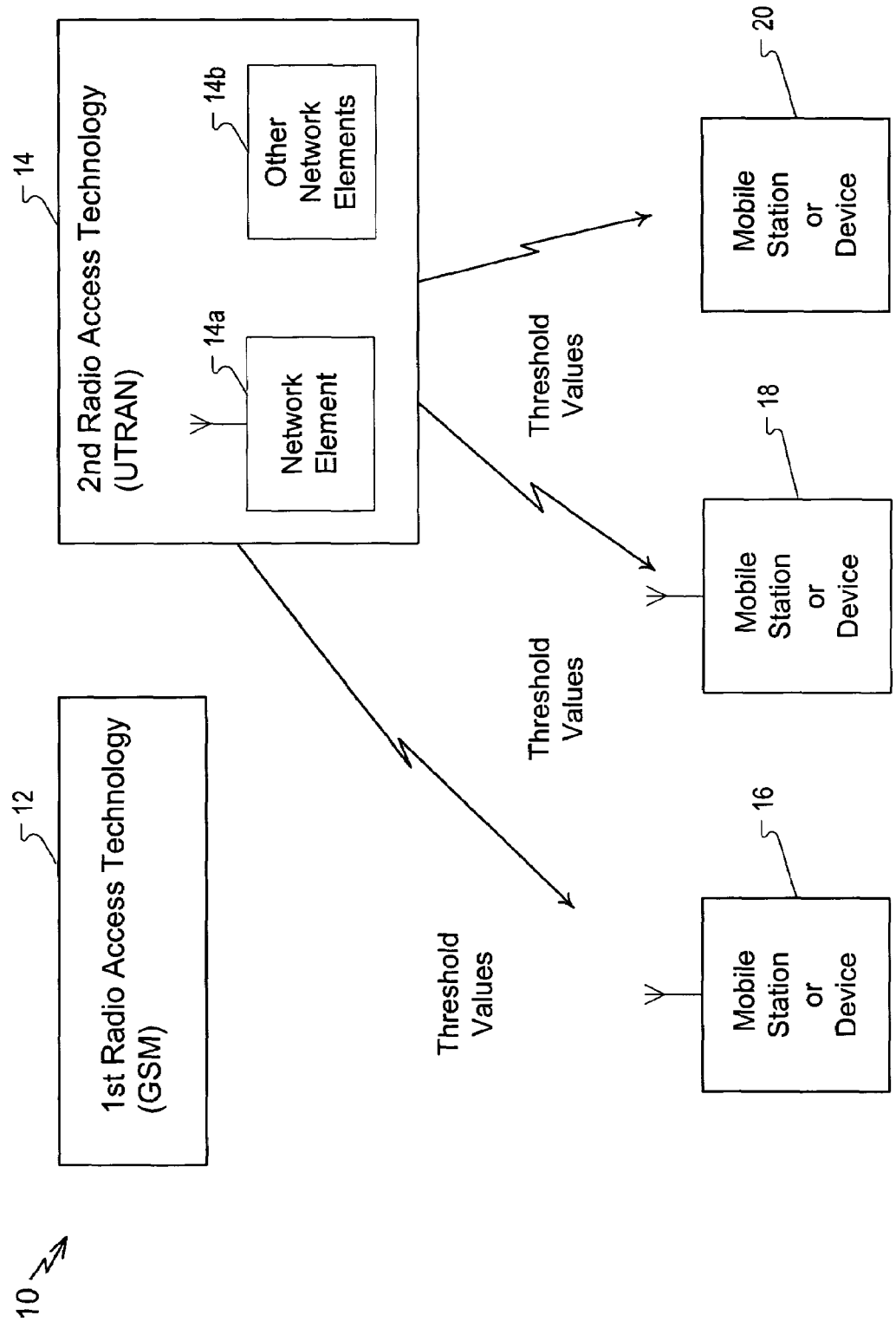
FIG. 2 shows a network having different radio access technologies (RATs) and mobile devices in a network cooperating according to the present invention.

FIG. 2 shows, by way of example, a wireless network generally indicated as 10 having a first RAT 12 and a second RAT 14 for communicating with mobile stations or devices 16, 18, 20. The first and second RATs 12, 14 are shown as different radio access technologies, such as a GSM and UTRAN, although the scope of the invention is intended to include other different types of RATs. The scope of the invention is not intended to be limited to the type or kind of RATs.

Figure 3:
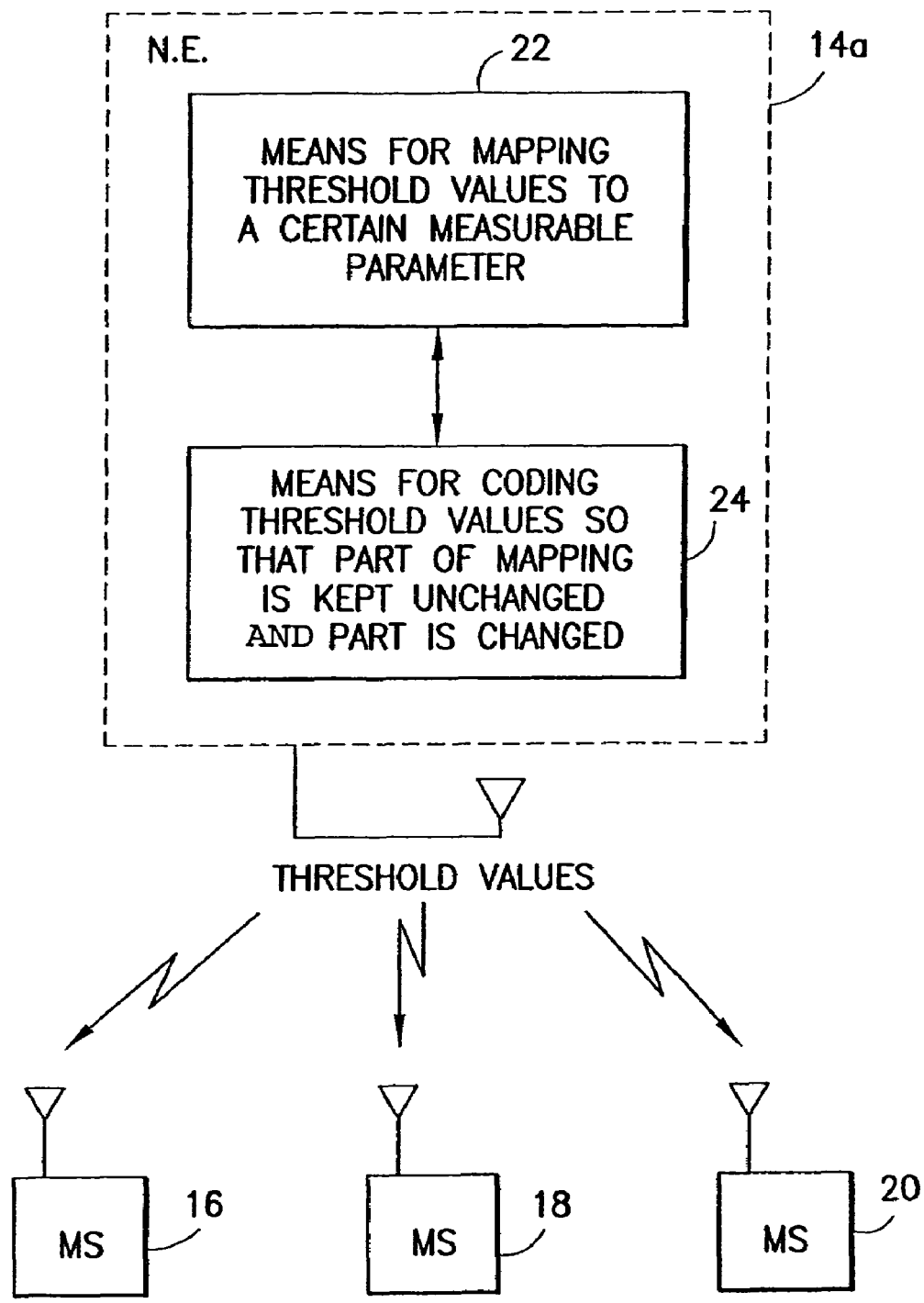
FIG. 3 shows a more detailed block diagram of the network element in FIG. 2.

As shown, the UTRAN 14 has a network element 14a, which is shown in greater detail in FIG. 3 and is the focus of the present invention. It is understood that the UTRAN 14 also has one or more other network elements 14b that are known in the art, which do not form part of the overall invention and are thus not described herein.

In operation, the network element 14a controls the operation of mobile devices 16, 18, 20 by sending threshold values thereto for performing various operations, such as handovers and/or cell reselection between the different RATs, such as the GSM to UTRAN, as shown. The scope of the invention is not intended to be limited to any particular operation or functionality in which the threshold values are used by the mobile devices 16, 18, 20. It is understood that the mobile devices 16, 18, 20 have different interpretations for the threshold values when using the same during such operations and/or functionality.

FIG. 3 shows the network element 14a in more detail, including having means 22 for mapping the threshold values to a certain measurable parameter. During the cell reselection process, the certain measurable parameter typically relates to measuring the strength of the Ec/No of the CPICH of the target UTRAN cell, consistent with that discussed above, although the scope of the invention is not intended to be limited to the type or kind of measurable parameter. The network element 14a also has means 24 for coding the threshold values in such a way that part of the mapping is kept unchanged and part of the mapping is changed in order to enable the different interpretations of the measurable parameter.

In particular, in the case identified above in relation to the standardization process, the threshold values may be all FDD_Qmin values that are too low to keep reliable calls and to avoid a ping-pong effect between GSM and Wideband Code Division Multiple Access (WCDMA). For example, only −13 dB (and maybe −14 dB) may be considered a high enough value and all other values are likely not to be used in practice. Hence current parameter values need to be changed. However, despite this need for change, it is important to keep −13 dB coding the same to avoid legacy phone or terminal problem during the transition period. When the network broadcasts the value −13 dB, both new and legacy phones or terminals work and new values can be started for use when the population in the field is changed from the old implementation to the new implementation. This way the new implementation can be done to new products without creating a transition problem in the field. (It is interesting to note that some phone companies might be against this change arguing that they have too many phones already in the field. With the present invention, this argument is not valid anymore.)

Table 1 provides an example of the mapping of old values to new values in relation to the associated 3-bit binary code, as follows:

TABLE 1

| Code | Old FDD Qmin (dB) | New FDD Qmin (dB) |
|------|-------------------|-------------------|
| 000  | −20               | −7                |
| 001  | −19               | −8                |
| 010  | −18               | −9                |
| 011  | −17               | −10               |
| 100  | −16               | −11               |
| 101  | −15               | −12               |
| 110  | −14               | −14               |
| 111  | −13               | −13               |

According to the present invention, the new and old values for binary codes 110 and 111 have the same value and are the part of the mapping that is kept unchanged, while the new and old values for the binary code 000, 001, . . . , 101 are the part of the mapping that is changed in order to enable the different interpretations of the measurable parameter.

In effect, the phone/network indicates in signalling information element value of the parameter (e.g. network broadcasts parameter to the phone as shown in FIG. 3). It is important to note that the aforementioned is only an example of how and where the present invention can be used. In view of this, this solution shall be understood as a general solution for other similar cases, including the alternative embodiment described below.

Mapping and Coding Means 22, 24

In FIG. 3, the mapping means 22 and the coding means 24 may be implemented using hardware, software, or a combination thereof. In a typical software implementation, the means 22 and 24 would be a microprocessor-based architecture having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation of the mapping means 22 and the coding means 24.

Mobile Stations or Devices 16, 18, 20

The mobile stations or devices 16, 18, 20 may be in the form of a mobile phone, terminal, station, device or other user equipment that are known in the art. In operation, the mobile stations or devices 16, 18, 20 communicate via the RATs 12, 14 to either send or receive data to or from an application node (not shown), etc. The mobile stations or devices 16, 18, 20 include handover, cell reselection and/or other suitable modules for moving from the first RAT 12 to the second RAT 14. The scope of the invention is not intended to be limited to any particular mobile phone or terminal either now known or later developed in the future, or the functionality involved when moving from the first RAT 12 to the second RAT 14, or vice versa.

Other Network Elements 14b

The other network elements 14b are all well known in the art and do not form part of the present invention, including other parts of the UTRAN or other suitable network not discussed herein, as well as the core network and other parts, modules and components thereof.

Computer Program and Products

The present invention also includes implementing the step of the method via a computer program running in a processing means in such a network element 14a, as well as including a computer program product with a program code, which program code is stored on a machine readable carrier, for carrying out the steps set forth herein, when the computer program is run in a suitable processing means.

Alternative Embodiment

In an alternative embodiment, the most probable old value(s) are not reused at all, so alternative values can be specified to be even better than the most probable old value. For example, based on system testing new parameter values can be defined more accurately to give the best possible system performance. In this case, for example, −11 dB and −12 dB could be better values than −13 dB, and then new coding could be like that set forth in Table 2, as follows:

| Code | New FDD Qmin (dB) |
|------|-------------------|
| 000  | −5                |
| 001  | −6                |
| 010  | −7                |
| 011  | −8                |
| 100  | −9                |
| 101  | −10               |
| 110  | −11               |
| 111  | −12               |

Scope of the Invention

The scope of the invention is not intended to be limited to any specific kind of network architecture, node, user equipment, mobile terminal, phone or device, and many different mobile terminals or devices, including laptop or notebook computers, are envisioned that may contain the fundamental features of the present invention described herein.

Accordingly, the invention comprises the features of construction, combination of elements and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A network element comprising:
    a module configured for mapping threshold values to a certain measurable parameter so as to enable the network element to control the operation of mobile devices that have different interpretations for the threshold values; and
    a module configured for coding the threshold values by decreasing the resolution and increasing the range of the threshold values in such a way that one part of the mapping is kept unchanged and another part of the mapping is changed in order to enable the different interpretations of the certain measurable parameter.

2. A network element according to claim 1, wherein the threshold values are FDD_Qmin parameters being used in a cell reselection procedure when the mobile device moves from one radio access technology (RAT) to another radio access technology (RAT).

3. A network element according to claim 2, wherein the network element is configured to control a cell reselection by the mobile device from a Global System for Mobile Communications (GSM) to a Universal Mobile Telecommunications System (UMTS).

4. A network element according to claim 1, wherein the network element forms part of a 3G Universal Terrestrial Radio Access Network (UTRAN).

5. A network element according to claim 4, wherein the network element forms part of a radio network controller (RNC).

6. A network element according to claim 4, wherein the network element forms part of a Node B.

7. A method comprising:
    mapping threshold values to a measurable parameter so as to enable the network element to control the operation of mobile devices that have different interpretations for the threshold values; and
    coding the threshold values by decreasing the resolution and increasing the range of the threshold values in such a way that one part of the mapping is kept unchanged and another part of the mapping is changed in order to enable the different interpretations of the measurable parameter.

8. A method according to claim 7, wherein the threshold values are FDD_Qmin parameters being used in a cell reselection procedure when the mobile device moves from one radio access technology (RAT) to another radio access technology (RAT).

9. A method according to claim 8, wherein the method includes controlling a cell reselection by the mobile device from a Global System for Mobile Communications (GSM) to a Universal Mobile Telecommunications System (UMTS).

10. A method according to claim 7, wherein the method includes forming the network element as part of a 3G Universal Terrestrial Radio Access Network (UTRAN).

11. A method according to claim 10, wherein the method includes forming the network element as part of a radio network controller (RNC).

12. A method according to claim 10, wherein the method includes forming the network element as part of a Node B.

13. A computer program product with a program code, which program code is stored on a machine readable carrier, for carrying out the steps according to claim 7 when the computer program is run in a processing means in a network element or other suitable network node.

14. A network element comprising:
    a module configured for mapping threshold values to a certain measurable parameter so as to enable the network element to control the operation of mobile devices that have different interpretations for the threshold values; and
    a module configured for coding the threshold values by decreasing the resolution and increasing the range of the threshold values in such a way that the mapping is changed in order to enable the different interpretations of the certain measurable parameter.

15. A network element according to claim 14, wherein one part of the mapping is kept unchanged and another part of the mapping is changed in order to enable the different interpretations of the certain measurable parameter.

16. Apparatus comprising:
    means for mapping threshold values to a certain measurable parameter so as to enable the network element to control the operation of mobile devices that have different interpretations for the threshold values; and
    means for coding the threshold values by decreasing the resolution and increasing the range of the threshold values in such a way that one part of the mapping is kept unchanged and another part of the mapping is changed in order to enable the different interpretations of the certain measurable parameter.

17. Apparatus according to claim 16, wherein the apparatus is a network element that forms part of a radio network controller (RNC) in radio access technology (RAT).

18. Apparatus according to claim 16, wherein the threshold values are FDD_Qmin parameters being used in a cell reselection procedure when the mobile device moves from one radio access technology (RAT) to another radio access technology (RAT).

19. apparatus according to claim 18, wherein the one radio access technology (RAT) is a Global System for Mobile Communications (GSM) and the other radio access technology (RAT) is a Universal Mobile Telecommunications System (UMTS).

* * * * *

UNITED STATES PATENT AND TRADEMARK OFFICE
CERTIFICATE OF CORRECTION

PATENT NO. : 7,522,920 B2  Page 1 of 1
APPLICATION NO. : 10/925639
DATED : April 21, 2009
INVENTOR(S) : Hannu et al.

It is certified that error appears in the above-identified patent and that said Letters Patent is hereby corrected as shown below:

In column 8 at line 54 (claim 19, line 1), please delete "apparatus" and insert --Apparatus-- therefor.

Signed and Sealed this

Sixteenth Day of March, 2010

David J. Kappos
*Director of the United States Patent and Trademark Office*